May 19, 1925.   1,538,770

E. WILDHABER

HOB

Filed Dec. 30, 1922   3 Sheets-Sheet 1

INVENTOR
E. Wildhaber
BY Wayne B Wells
ATTORNEY

May 19, 1925.

E. WILDHABER

HOB

Filed Dec. 30, 1922

INVENTOR
E. Wildhaber
BY Wayne B Wells
ATTORNEY

May 19, 1925.  
E. WILDHABER  
HOB  
Filed Dec. 30, 1922  
1,538,770  
3 Sheets—Sheet 3
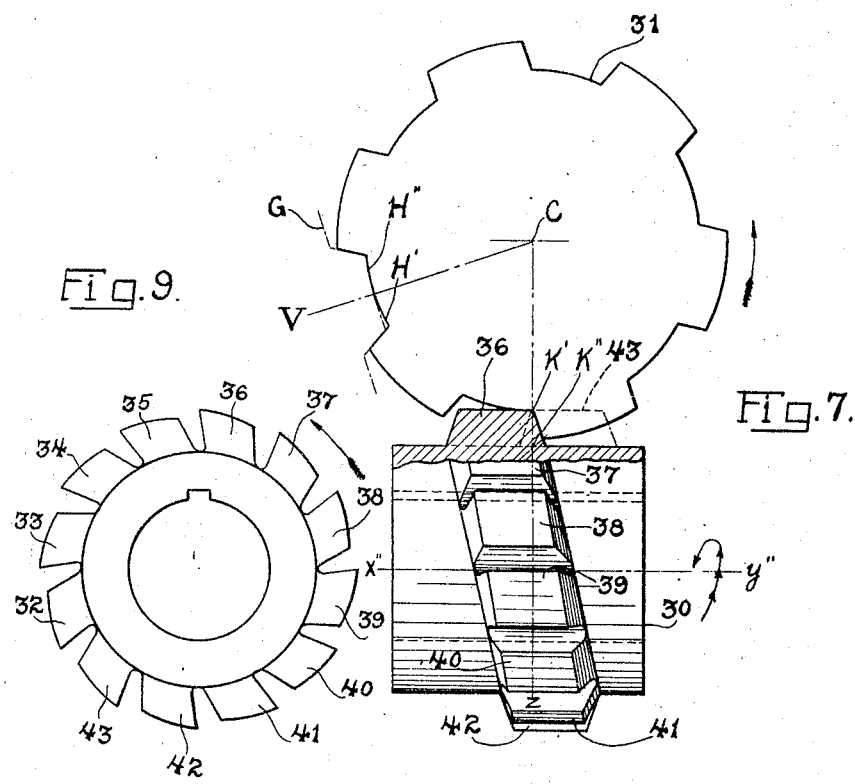
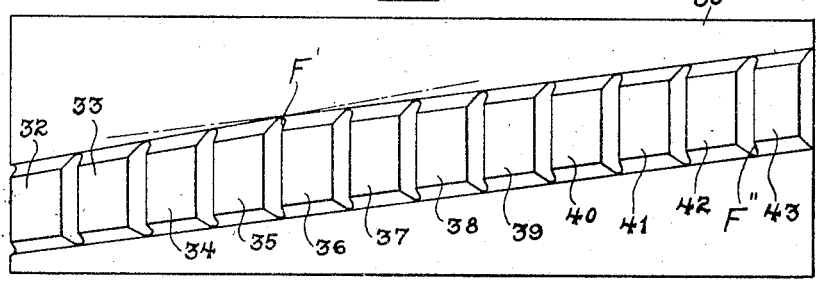
INVENTOR  
E. Wildhaber  
BY Wayne B Wells  
ATTORNEY Patented May 19, 1925.

1,538,770

UNITED STATES PATENT OFFICE.

ERNEST WILDHABER, OF BROOKLYN, NEW YORK, ASSIGNOR TO NILES-BEMENT-POND COMPANY, OF NEW YORK, N. Y., A CORPORATION OF NEW JERSEY.

HOB.

Application filed December 30, 1922. Serial No. 609,941.

*To all whom it may concern:*

Be it known that I, ERNEST WILDHABER, a citizen of the Republic of Switzerland, residing at Brooklyn, in the county of Kings and State of New York, have invented certain new and useful Improvements in Hobs, of which the following is a specification.

My invention relates to hobs and particularly to hobs for cutting sprocket wheels of the silent chain type, spline shafts, and similar articles having teeth provided with straight profiles.

One object of my invention is to provide a hob for cutting straight sided teeth on a sprocket wheel blank that shall consist of teeth arranged in the form of a thread and having two form cutting edges for simultaneously finishing one side of each of two alternate blank teeth.

Another object of my invention is to provide a hob that will cut sprocket wheels to fit a predetermined chain irrespective of the number of teeth on the blank.

Another object of my invention is to provide a hob for cutting straight sided teeth that shall comprise teeth arranged in the form of a thread having two straight finishing cutting edges formed on different hob teeth, one of the teeth having a finishing cutting edge being located at the end of the hob.

Another object of my invention is to provide a hob of the above indicated character that shall comprise teeth arranged in the form of a thread, the lead on one side of the hob teeth differing from the lead on the opposite side of the hob teeth and two of the hob teeth having finishing cutting edges.

A further object of my invention is to provide a hob of the above indicated character that shall comprise teeth arranged in the form of a thread, a straight finishing edge being formed on each of two of the hob teeth and one of the teeth having a finishing edge formed thereon being located at one end of the hob, one side of the hob teeth having two different leads and the opposite side of the hob teeth having one lead throughout.

Heretofore, it has been customary, with very few exceptions, to hob various articles by means of a generating operation. In such case, each of the various teeth on the hob serves to form a portion of the final contour of each tooth on the blank being cut. However, in a form hob, the final contour of each tooth on the blank is not formed by a number of hob teeth. The last or final tooth on the hob may be set to cut on a radial line of the blank and in such case the exact form of the last hob tooth will be cut on the blank. Hobs of the above indicated character have been made heretofore for shaping screw slotting cutters. When a hob is operated in such manner, one tooth on the hob operates substantially in the same manner as the tooth on a milling cutter. It may be noted in this regard that form hobs of the above indicated character need to be centered in the same manner as milling cutters.

In a form hob constructed in accordance with my invention, a sprocket wheel of the silent chain type or a spline shaft may be hobbed with ease and efficiency. In my preferred construction opposite sides of adjacent blank or sprocket tooth spaces are simultaneously finished by cutting edges located on different hob teeth. By so constructing the hob with two finishing cutting edges located on different teeth, it is possible to hob sprocket wheels having various numbers of teeth if the pitch remains the same. Although my invention is particularly directed to the hobbing of sprocket wheels and spline shafts, it is to be understood that such hobs are equally applicable to hobbing other articles having substantially straight tooth profiles.

In the preferred embodiment of my invention, the hob is provided with teeth arranged in the form of a thread and one side of each of two teeth has a formed finishing cutting edge. The tooth carrying one of said finishing edges is preferably located at the end of the hob. The side of the hob teeth carrying the finishing cutting edge intermediate the ends of the hob has two leads, the lead of said side is constant up to the finishing edge and then is changed so as to prevent cutting by the teeth beyond such finishing edge. The lead on the opposite side of the hob teeth is maintained uniform and may be the same as the lead of the teeth following the finishing edge on the side of the hob teeth having the finishing cutting edge midway between the ends of the hob. The method of operating a hob constructed in accordance with my invention is disclosed in my application Serial No. 609,944, filed December 30, 1922. It is to be understood that hobs constructed in accordance with my invention may be made in accordance with any well known methods. Preferably, certain teeth of the hob are ground and especially the two finishing cutting edges.

In the accompanying drawings:

Fig. 7 is a view illustrating the hobbing of a spline shaft.

Fig. 8 is a developed view of the hob shown in Fig. 7.

Fig. 9 is an end view of the hob shown in Fig. 7.

Figures 1, 2:
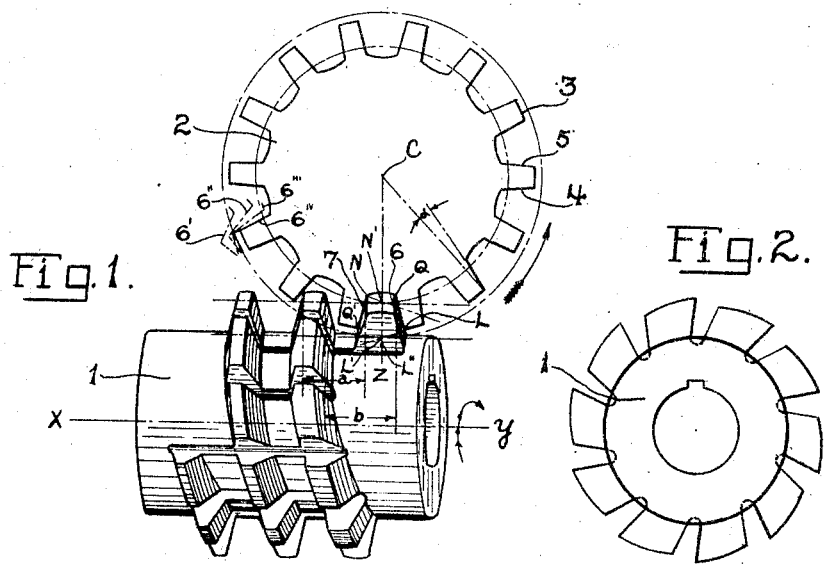
Figure 1 is a diagrammatic view wherein one tooth on the hob carries the two finishing cutting edges.
Fig. 2 is an end view of the hob shown in Fig. 1.
Figure 3:
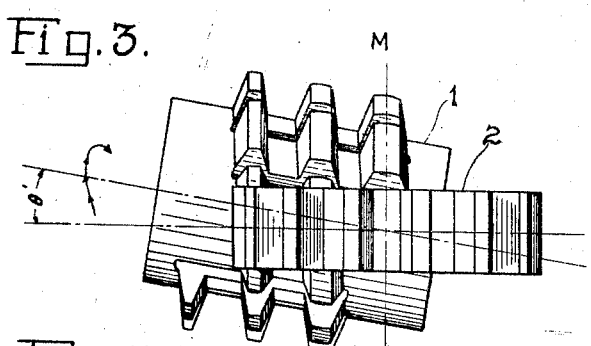
Fig. 3 is a plan view of the hob and blank shown in Fig. 1.

Referring to the accompanying drawings and particularly to Figs. 1, 2 and 3, a hob 1, rotating on an axis $xy$ is shown in engagement with a sprocket wheel blank 2. The blank is assumed to rotate on an axis MN and comprises fourteen teeth 3 having straight sides 4 and 5. One of the sides 5 is shown making an angle $\alpha$ with a radial line on the blank. Such angle $\alpha$, it will be noted, varies with the number of teeth on the sprocket wheel.

The action of form hobs in cutting a sprocket wheel or a splined shaft may best be explained by considering the planing action of a suitable rack in shaping a sprocket wheel or a spline shaft. The rack may be assumed to mesh with the sprocket wheel blank in the position shown occupied by the hob 1. The rack may be considered to be a projection of a hob.

The pitch lines for a rack adapted to cut the teeth on the sprocket wheel may be obtained by considering points on the teeth of the wheel. The sprocket wheel 2 is assumed to be in a central position with a tooth space bi-sected by a radial line CZ. A line perpendicular to the side 4 of the tooth to the right of the line CZ is drawn through a point L. The point L is assumed to be located on the side 4 of the tooth under consideration near the top thereof. The line through the point L intersects the line CZ at a point L'. A line through the point L' perpendicular to the line CZ determines the pitch line for a rack which will cut the side QL or 4 of the tooth shown to the right of the line CZ. During meshing between the rack and the sprocket wheel the pitch line through L' rolls on a circle through L' having a center located at C.

Assume the rack being considered to have a cutting edge 6 parallel to the side LQ of a hob tooth and to be slowly moved along the pitch line through L' while the blank 2 is correspondingly rotated about the center C. If such movement between the rack and the blank is continued beyond a predetermined point the side 6 on the rack will finally generate an involute on the blank tooth. The involute, however, is only formed on the blank tooth when the line 6 has been moved to the right of the line LQ as shown in Fig. 1 of the drawings. Thus, the line LQ is the starting point for the generating operation and up to such position the line 6 cuts its own profile on the blank tooth. Accordingly if the rolling motion between the rack and the blank is stopped when the line 6 is in the position LQ, the rack will cut the straight profile LQ and no trace of an involute will be formed on the blank teeth.

On the left of Fig. 1 are diagrammatically shown four different positions of the cutting side 6 of a rack tooth while rolling on the circle through point L' and having a center at C. In each of positions $6^I$, $6^{II}$, and $6^{III}$ of the side 6 on a rack tooth, it is evident that the side 6 cuts its own profile on a blank tooth. Moreover, it is apparent that each subsequent position of the cutting edge 6 completely cuts away the previous profile formed by the cutting edge. In position $6^{IV}$ the cutting edge 6 coincides with the line LQ and cuts the correct profile on the blank tooth. If the cutting edge 6 were moved beoynd the position $6^{IV}$ an involute would successively be formed on the blank tooth.

The above operation of the assumed rack is only true when the pitch line of the rack passes through the point L' and when the rack and the blank are considered as having relative rolling movement on such pitch line. If the pitch line is assumed to pass through the point L'', a point beyond the point L' on the line CZ, the cutting edge 6 will form a profile similar to LQ on the blank tooth. However, the line LQ is not the limiting position and the position when the forming of an involute is started. It is preferable in the case of a hob to use the pitch line where the line LQ serves as a limiting position. A larger lead would cause the thickness of the hob teeth to decrease more towards the end of the hob.

The opposite side NQ' of the tooth space under consideration may be formed by the assumed rack in the manner similar to the forming of a side LQ by the rack. Through point N at the base of the tooth a line is drawn perpendicularly to the line NQ'. Such line intersects the line CZ at the point N'. The pitch line of the assumed rack passes through the point N' perpendicularly to the line CZ. A cutting edge 7, which is assumed parallel to the line NQ', is moved toward the blank along the pitch line passing through the point N'.

The cutting edge 7 will start to generate an involute when the line NQ' is passed. Accordingly, the relative movement between the hob and the rack is stopped when the position NQ' is reached in order that the cutting edge 7 will form its own contour similar to the line NQ' on the tooth of the blank. The above statement is true for straight feed, per revolution of the blank, which is equal to or smaller than the circumference of the circle having a radius CN'. The same explanation which was given in explaining the cutting of the side QL of a blank tooth is also applicable to the cutting of the side NQ' of a tooth.

In place of considering the blank teeth to be formed with a rack by means of a planing process, such teeth may be considered to be formed by a hob which would mesh with the rack. The hob would have two different leads and accordingly the thickness of the hob teeth would vary as is indicated in Fig. 1 of the drawings. The two leads for the sides of the hob teeth would be constructed in accordance with the different pitches of the above considered rack. It will be noted that such a hob is used for hobbing sprocket wheels of the silent chain type and that a different hob must be provided if the number of teeth on the sprocket wheel blank changes.

The hob 1 in Fig. 3 is shown set at an angle θ' with respect to the blank 2. Although such angle is usually made equal to the lead angle of the pitch circle, it may be varied and even made zero. The direction of movement of the hob and blank are indicated by the arrows in Figs. 1, 2 and 3 of the drawings. The difference between the pitch on the two sides of the hob teeth is indicated by the lines a and b in Fig. 1 of the drawings.

Figure 4:
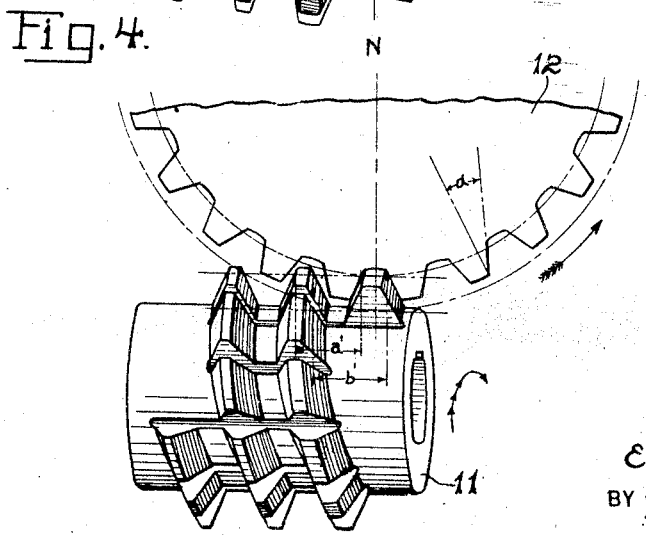
Fig. 4 is a view similar to Fig. 1 showing a sprocket wheel with a larger number of teeth.

Referring to Fig. 4 of the drawings, a hob 11 is shown operating on a sprocket wheel 12 having a larger number of teeth than the sprocket wheel 2 shown in Figs. 1, 2 and 3 of the drawings. The angle α between a side of a blank tooth and a radial line is clearly shown in Fig. 4 of the drawings to be larger than in Fig. 1. Moreover, it is apparent that the difference in lead between the two sides of the hob teeth can be kept smaller the larger the number of teeth to be formed on the sprocket wheel. The difference between the pitch on the two sides of the hob teeth is indicated by the lines a' and b' in Fig. 4 of the drawings.

Figure 5:
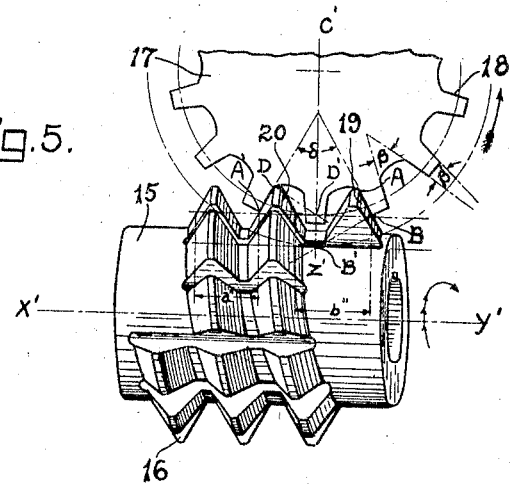
Fig. 5 is a diagrammatic view illustrating a hob having the two finishing cutting edges located on different teeth.
Figure 6:
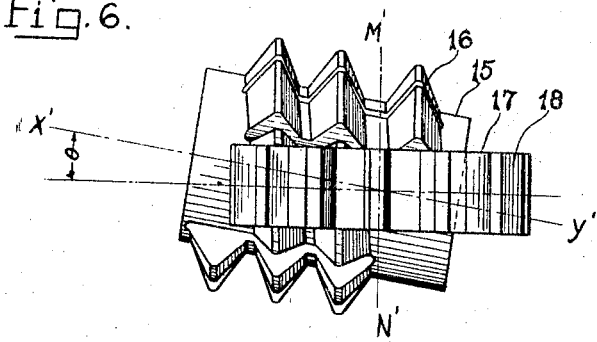
Fig. 6 is a plan view of the hob and blank shown in Fig. 5.

According to the above method sprocket wheels having different tooth numbers require different hobs. Referring to Figs. 5 and 6 of the drawings, a hob is illustrated which is adapted to form teeth on various sprocket wheels irrespective of the number of teeth thereon if such sprocket wheels are adapted to operate with chains of the same pitch. In Fig. 5, it is apparent the angle ε formed by the sides of the tooth spaces or the angle ε' formed by the two sides of a tooth change in accordance with the number of teeth on the blank. However when considering sprocket wheels of the silent chain type, it is apparent the angle γ which is formed by opposite sides of adjacent tooth spaces remains unchanged irrespective of the number of teeth on the blank. It is evident the angle γ must remain constant if the various sprocket wheels are to mesh with chains having the same size links therein, the angle γ being the angle of the sides of the links. Thus, if a hob is provided with teeth formed in accordance with the angle γ and is adapted to finish adjacent sides of alternate blank teeth on the blank, one hob may be provided for hobbing sprocket wheels of various numbers of teeth which are adapted to operate with the same size chains. The finishing cut, which is indicated as being effected in Fig. 5 of the drawings, is preferably performed in the symmetrical position of the blank.

A hob 15 having teeth 16 is shown in engagement with a sprocket wheel blank 17. The hob rotates on an axis X'Y' and the blank 17, having a center C', rotates on an axis M'N'. The blank 17 is provided with teeth 18, one of which is symmetrically placed with respect to a radial line C'Z'. The hob 15 is provided with two teeth 19 and 20 having formed finishing edges which serve to finish the teeth on the blank. The finishing cutting edge of the tooth 19 is adapted to finish one side of the tooth to the right of the radial line C'Z', and the finishing cutting edge of the tooth 20 is adapted to finish the opposite side of the tooth to the left of the radial line C'Z', as shown in Fig. 5 of the drawings. The edge of the tooth finished by the hob tooth 19 is indicated by reference characters AB and the edge of the blank tooth which is finished by the hob tooth 20 is indicated by the reference characters DA'.

The pitch lines for the hob 15 are determined in a manner similar to the obtaining of the pitch lines of the hob shown in Figs. 1, 2 and 3 of the drawings. A line is drawn through the point B perpendicular to the line AB and the intersection of such line with the radial line C'Z' determines the point B'. The lead of the one side of the hob teeth corresponds to the pitch line passing through the point B′ perpendicular to the radial line C′Z′. A line DD′ is drawn through D perpendicular to the line A′D. The line thus formed intersects the radial line C′Z′ at the point D′. The pitch line, which determines the lead for the other side of the hob teeth, is the pitch line formed through the point D′. The leads of the hob teeth are preferably determined in accordance with the sprocket wheel having the lowest number of teeth. In such case, the positions AB and A′D will be the limiting positions for forming a sprocket wheel of such number of teeth and for a sprocket wheel having a larger number of teeth, the limits will extend beyond the lines AB and A′D.

A hob, such as illustrated in Figs. 5 and 6 of the drawings, is provided with a somewhat larger lead on one side of the hob teeth, namely, the side which carries the cutting edge adapted to finish the side AB of the blank tooth. Moreover, as shown, none of the hob teeth extend beyond the line AB. The other side of the hob teeth having the cutting edge which forms the line A′D on the blank teeth has a smaller lead than the lead first mentioned. The lead last mentioned is maintained only up to the finishing cutting edge on the tooth 20. Beyond the tooth 20 the lead of the hob may be made larger and in fact the same as the lead on the opposite side of the hob teeth. It is preferable not to have a large difference in lead between the two sides of the teeth inasmuch as a large difference in the lead causes the thickness of the hob teeth to decrease somewhat rapidly.

Although hobs of the character shown in Figs. 5 and 6 may be formed in a lathe, it is preferable to form such hobs in accordance with the methods disclosed in my application Serial No. 566,855 filed June 8, 1922. In Fig. 6 of the drawings, the hob is shown set at an angle $\theta$ which is the lead angle of the pitch circle. However, the setting angle between the blank and the hob may be varied and in fact the angle $\theta$ may be made equal to zero if so desired. It is well known that involute gear hobs may be set at any desired angle with respect to the blank being cut and likewise hobs of the above indicated type may be constructed to be set at any desired angle with respect to the blank being cut. It is apparent that a hob set square with respect to the blank being cut is more easily centered than a hob set at an acute angle with respect to the blank.

Referring to Figs. 7, 8 and 9 of the drawings, a hob 30 is shown in engagement with a spline shaft 31. The hob 30 is adapted to rotate on an axis $x''—y''$ and the spline shaft 31 is adapted to rotate upon an axis C. The hob tooth 36 is shown in operative position in Fig. 7 of the drawings and the position of the hob tooth 43 when moved to operative position is indicated by dotted lines in Fig. 7 of the drawings.

The hob 30 is constructed somewhat in the manner of the hob illustrated in Figs. 5 and 6 and is provided with two finishing cutting edges which are located on different hob teeth. It may be said that the two sides of a tooth space on a spline shaft are finished by different hob teeth.

In case both sides of the last tooth on the hob carried finishing cutting edges, trouble would be experienced in cutting the bottom of each tooth space. Referring to Fig. 7 of the drawings, a hob tooth G is shown in position on a radial line C—V for finishing two sides of a blank tooth space. The hob teeth in such case would necessarily be provided with the top portion partly straight and partly curved, as indicated by the tooth G in Fig. 7 of the drawings. The bottom portion of each tooth space on the blank can be generated only along the line C—V, and accordingly the curved portion of the tooth space could be generated by straight hob teeth only below the center line C—V and after the cutting teeth had passed the center. In this regard it may be noted the roughing teeth on the hob, one tooth G only of which is shown, are assumed to extend above the center line of the blank in Fig. 7, of the drawings. The lower portion H′ may be generated by the hob teeth whereas the upper portion H″ must from necessity be cut with a formed cutting edge on the hob teeth. Accordingly, it is impossible to avoid constructing the tops of the hob teeth without a composite outline.

It is possible to form the two finishing cutting edges on the same tooth and provide more teeth after the finishing tooth. In other words, teeth may be provided which come into cutting action after the operation of the finishing tooth. By such means, the tops of the hob teeth may be kept substantially straight. However, the manufacture of a hob having a finishing tooth located intermediate the ends thereof is somewhat complicated inasmuch as the lead on both sides of the hob teeth must change at the finishing tooth. If the lead were not so changed, the roughing teeth would not clear the blank teeth. Furthermore the teeth following the finishing tooth would do little cutting.

By effecting finishing cuts with two sides of different hob teeth it is possible to equalize the work between the various hob teeth and to provide a hob which is comparatively simple in construction. A hob of the above indicated type is shown developed in Fig. 8 of the drawings. In Fig. 8 of the drawings, the two finishing cutting edges F′ and F″ are shown formed on the hob teeth 36 and 43. In this regard it may be noted that the cutting tooth 36 having a finishing edge F' is shown in operative position in Fig. 7 of the drawings. On the upper side of the hob teeth as shown in Fig. 8 of the drawings, the lead changes at the tooth 36. Thus, the teeth 32, 33, 34 and 35 are provided with a lead somewhat larger than on the teeth 36, 37, 38, 39, 40, 41, 42 and 43. Thus, the upper sides of the hob teeth are formed along two different helices.

The second finishing cutting edge F'' is formed on the last cutting tooth as shown in Fig. 8 of the drawings. By so locating the second cutting edge on the last hob tooth, it is possible to provide but a single lead on the lower side of the teeth. Such lead on the lower side of the teeth is preferably made equal to the lead of the teeth 36 to 43, inclusive, on the upper side of the hob teeth. Accordingly, in the hob shown in Figs. 7, 8 and 9 of the drawings, it is possible to form the two cutting edges on different hob teeth and to have two different leads on only one side of the hob teeth. The two different leads correspond to the pitch of a rack which is equivalent to the hob and which would mesh with the spline shaft after the same had been cut. The pitch lines are determined in the manner set forth in discussing Figs. 5 and 6 of the drawings and also in discussing Figs. 1, 2, 3 and 4 of the drawings. The points K' and K'' on the radial line C—Z in Fig. 7 of the drawings are points which are determined by drawing lines normal to the sides of the spline shaft teeth. The pitch lines as heretofore explained are obtained by drawing lines through the points K' and K'' perpendicular to the line C—Z.

If a hob of this type is ground, preferably only the relief surfaces ahead of an up to the finishing edges (F' and F'' in Fig. 8) are ground. The relief surfaces of the sides following a finishing cutting edge are preferably left unground. Thus, the upper sides of the teeth 36, 37, 38, 39, 40, 41, 42 and 43 would be left unground. Such side cutting edges do no cutting whatever. They may therefore be taken back further than shown in the drawings, and particularly so if the hob is to be ground. The helix of the upper side of the teeth 37, 38, 39, 40, 41, 42 and 43 (Fig. 8) intersects then the helix constituted by the upper sides of the teeth 32, 33, 34, 35 and 36 ahead of F', which is another way of saying that the finishing edge F' protrudes over the helix of the following teeth.

It will be understood that such changes and modifications may be made in my invention as fall within the limits of the appended claims.

What I claim is:

1. A hob for milling sprocket wheels, comprising teeth arranged in the form of a thread and having two formed cutting edges located on different teeth, the lead on the two sides of the hob teeth being different and the thickness of the teeth being progressively less from one end to the other end of the hob.

2. A hob, comprising teeth arranged in the form of a thread, the lead on the two sides of the hob teeth being different for cutting straight sided sprocket wheel teeth of a given pitch on blanks independent of the number of teeth on the blanks.

3. A hob, comprising teeth arranged in the form of a thread, the lead on the two sides of the teeth being different and of such amount that two teeth effect the finishing cuts to form straight sided sprocket teeth on a blank.

4. A hob for milling a blank having straight sided teeth making a positive angle with a radial line on the blank, comprising teeth arranged in the form of a thread and having two formed cutting edges located on different teeth, the thickness of the teeth being progressively less from one end to the other end of the hob, and the lead on the two sides of the teeth varying.

5. A form hob for milling a blank having straight sided teeth making a positive angle with a radial line on the blank, comprising teeth arranged in the form of a thread, the lead on the two sides of the teeth being so varied as to change the thickness of the teeth so that two teeth effect the finishing cuts.

6. A form hob, comprising teeth formed on a body member, two formed cutting edges for effecting the finishing cuts on the two sides of the teeth of the blank being located on different hob teeth.

7. A form hob, comprising teeth arranged in the form of a thread, the lead on the two sides of the teeth being different and two formed cutting edges for effecting the finishing cuts on the teeth of the blank being located on different hob teeth.

8. A form hob, comprising teeth arranged in the form of a thread, two formed cutting edges for effecting finishing cuts on the two sides of the teeth of the blank being located on different hob teeth, one of the finishing teeth being located at the end of the hob.

9. A form hob, comprising teeth arranged in the form of a thread, the lead on the two sides of the teeth being different and two formed cutting edges for effecting finishing cuts on the teeth of the blank being located on different hob teeth, one of the finishing teeth being located at the end of the hob.

10. A form hob, comprising teeth arranged in the form of a thread, two formed cutting edges located on different hob teeth for finishing the two sides of the teeth on the blank, said finishing cutting edges being substantially straight.

11. A form hob for cutting teeth on sprocket wheels, comprising teeth arranged in the form of a thread, said hob teeth having two finishing cutting edges located on different hob teeth for simultaneously finishing one side of each of two blank teeth.

12. A form hob for cutting teeth on sprocket wheels, comprising teeth arranged in the form of a thread, said teeth having two finishing cutting edges formed on two adjacent hob teeth for simultaneously finishing one side of two blank teeth.

13. A form hob for cutting teeth on sprocket wheels, comprising teeth having two substantially straight finishing cutting edges, said two formed cuting edges being located on opposite sides of two adjacent hob teeth.

14. A form hob for cutting teeth on sprocket wheels, comprising teeth having two formed straight cutting edges located on different teeth, the cutting edges on the hob teeth have approximately the same inclination as the sides of a chain link adapted to fit the sprocket wheel blank.

15. A form hob for cutting teeth on sprocket wheels of the silent chain type, comprising teeth having straight cutting edges, the cutting edges on the hob teeth having approximately the same inclination as the sides of a chain link adapted to fit the sprocket wheel blank and being so arranged as to cut sprocket wheels of various numbers of teeth.

16. A form hob, comprising teeth arranged in the form of a thread, the cutting edges on one side of the hob teeth being grouped along helices and the cutting edges on the opposite side of the hob teeth being grouped along a single helix.

17. A form hob, comprising teeth arranged in the form of a thread, a series of the hob teeth being of constant thickness and a second series of the hob teeth being formed with a gradually changing thickness.

18. A form hob, comprising teeth arranged in the form of a thread, a series of the hob teeth being of constant thickness and a second series of the hob teeth being formed with a gradually decreasing thickness, the hob teeth being so arranged to effect cutting by the second series of teeth after the first series of hob teeth have effected a cutting operation.

19. A form hob, comprising teeth arranged in the form of a thread, a series of the hob teeth being of constant thickness and a second series of the hob teeth being formed with a gradually decreasing thickness.

20. A form hob, comprising teeth arranged in the form of a thread and having two ground formed edges located on different hob teeth, one of said ground finishing cutting edges projecting beyond the surface formed by the cutting edges of the subsequent teeth.

21. A form hob, comprising teeth arranged in the form of a thread and having two ground formed edges located on different hob teeth, one of said formed cutting edges being located between the ends of the hob, the side relieved surfaces preceding the finishing edge being ground and the side relieved surfaces following the finishing cutting edge being unground.

22. A form hob, comprising teeth arranged in the form of a thread and having two ground formed edges located on different hob teeth, one of said formed edges on the hob serving to cut a similar contour on the blank, a portion only of the side relieved surfaces on the hob being ground.

23. A form hob for cutting teeth on sprocket wheels, comprising teeth arranged in the form of a thread and having two form cutting edges located on different teeth, said form cutting edges being so located as to simultaneously effect finishing cuts on opposite sides of alternate blank teeth.

24. A form hob for cutting teeth on sprocket wheels, comprising teeth arranged in the form of a thread and having two form cutting edges located on different teeth, the teeth having finishing edges formed thereon being located in side by side relation.

25. A form hob for cutting teeth on sprocket wheels, comprising teeth arranged in the form of a thread and having two form cutting edges located on different hob teeth, said cutting edges being so located as to simultaneously effect finishing cuts on two different blank teeth.

In testimony whereof, I hereto affix my signature.

ERNEST WILDHABER.